US008644883B2

(12) United States Patent
Jin et al.

(10) Patent No.: US 8,644,883 B2
(45) Date of Patent: *Feb. 4, 2014

(54) DISPLAY CONTROL APPARATUS AND METHOD IN A MOBILE TERMINAL CAPABLE OF OUTPUTTING VIDEO DATA TO AN EXTERNAL DISPLAY DEVICE

(75) Inventors: Sang-Hoon Jin, Suwon-si (KR); Han-Shil Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1037 days.

This patent is subject to a terminal disclaimer.

(21) Appl. No.: 11/784,414

(22) Filed: Apr. 6, 2007

(65) Prior Publication Data

US 2007/0243907 A1    Oct. 18, 2007

(30) Foreign Application Priority Data

Apr. 17, 2006  (KR) .................. 10-2006-0034719

(51) Int. Cl.
*H04M 1/00*    (2006.01)
(52) U.S. Cl.
USPC ................. 455/566; 455/567; 455/412.2
(58) Field of Classification Search
USPC ............. 455/566, 415, 403, 557, 567, 344, 455/412.2, 466; 348/14.01, 552, 14.11; 370/311
See application file for complete search history.

(56) References Cited

U.S. PATENT DOCUMENTS

| | | | |
|---|---|---|---|
| 6,529,742 B1 * | 3/2003 | Yang | 455/556.1 |
| 2002/0066115 A1 | 5/2002 | Wendelrup | |
| 2003/0064759 A1 * | 4/2003 | Kurokawa et al. | 455/566 |
| 2004/0006548 A1 * | 1/2004 | Mahmood | 707/1 |
| 2005/0101343 A1 * | 5/2005 | Hsiao | 455/550.1 |
| 2007/0093275 A1 * | 4/2007 | Bloebaum et al. | 455/566 |

FOREIGN PATENT DOCUMENTS

| | | |
|---|---|---|
| CN | 1496181 | 5/2004 |
| CN | 2641944 | 9/2004 |
| EP | 1 307 062 | 5/2003 |
| EP | 1 553 794 | 7/2005 |
| JP | 2004-159099 | 6/2004 |
| KR | 1020010048818 | 6/2001 |
| KR | 1020010059645 | 7/2001 |

OTHER PUBLICATIONS

Kato-manual translation-JP204159099_pub 6_03_2004.pdf.*

* cited by examiner

*Primary Examiner* — Charles Appiah
*Assistant Examiner* — Alexander Yi
(74) *Attorney, Agent, or Firm* — Jefferson IP Law, LLP

(57) ABSTRACT

Disclosed is a display control apparatus and method in a mobile terminal capable of outputting video data to an external display device, which implements a function of using other services in the mobile terminal, separately from the service provided to the external display device connected with the mobile terminal. To accomplish the above function, the controller determines whether an event occurs or not during displaying video data sent by the mobile terminal on the external display device and upon occurrence of an event, displays a screen for processing the event on the mobile terminal. Thus, a user can enjoy concurrent service by using other services through the mobile terminal while continuing to watch video data currently being displayed on the external display device. In addition, irrespective of the screen of the external display device, information relative to the event is only displayed on the mobile terminal so that a user's privacy can be fully protected.

12 Claims, 6 Drawing Sheets

DISPLAY CONTROL APPARATUS AND METHOD IN A MOBILE TERMINAL CAPABLE OF OUTPUTTING VIDEO DATA TO AN EXTERNAL DISPLAY DEVICE

PRIORITY

This application claims the benefit under 35 U.S.C. §119(a) of an application entitled "Display Control Apparatus and Method in a Mobile Terminal Capable of Outputting Video Data to an External Display Device" filed in the Korean Intellectual Property Office on Apr. 17, 2006 and assigned Serial No. 2006-34719, the entire disclosure of which is incorporated herein by reference.

BACKGROUND OF THE INVENTION

1. Field of the Invention

The present invention relates generally to a display apparatus and method in a mobile terminal, and in particular, to a display control apparatus and method in a mobile terminal capable of outputting video data to an external display device in order for a user to enjoy concurrent service.

2. Description of the Related Art

Along with the development of digital broadcasting technology and mobile telecommunication technology in recent years, the public has taken great interest in digital broadcasting services that enable users to watch digital broadcasts on mobile terminals, even when the user is in motion. Due to the great interest in the digital broadcasting services, the focus of the development has been moving from a passive broadcasting watching scheme that users watch merely TV programs without taking any action to an active broadcasting management scheme that allows users to see a variety of information related to goods displayed on a TV program currently being broadcast. For example, the active broadcasting management scheme allows a user to purchase goods displayed on a TV program while watching the TV program.

Also, a concern is being raised as to Digital Multimedia Broadcasting (DMB) services through wireless mobile terminals. The current DMB services make connections available anywhere and anytime with the mobile terminals, but they are disadvantageous in that the small screen size of the mobile terminals do not allow a number of people to simultaneously watch a TV program displayed on the screen of the mobile terminal. Thus, the trend is for developing the mobile terminal to have a function to output video signals to external display units, such as a television, a project and the like, having a screen size larger than that of the mobile terminal. The mobile terminal having TV-out function can output video data including moving pictures and broadcasting data, currently being displayed on the screen of the mobile terminal, to an external display device. Therefore, users are able to simultaneously watch TV programs through the larger screen.

Hereinafter, an example of a mobile terminal connected with a television will be provided with reference to FIG. 1. FIG. 1 illustrates a conventional mobile terminal having TV-out function, connected with a television. As shown in FIG. 1, a mobile terminal 10 is connected with a television 30, which is a type of external display device, through a TV-out cable 20. As shown in FIG. 1, a broadcast including a TV program is displayed on the screen of the television 30 rather than being displayed on the screen of the mobile terminal 10. Generally, as in the screen display control scheme of the mobile terminal 10, the television 30 displays broadcasts on the screen under the same display scheme. Thus, when events including incoming call and message reception occur while watching TV programs, an event message box indicated by reference numeral 40 in FIG. 1 is displayed on the screen of the television 30. However, as shown in FIG. 1, the event message box 40 covers some portion of the screen on which broadcast is being currently displayed. More specifically, when a number of people are watching a TV program through the television 30, viewers may feel inconvenienced by the unnecessary information displayed on the screen.

In addition, personal information of the mobile terminal user is undesirably publicly displayed, creating a potential infringement on the user's privacy. Further, when a user is checking information related to goods desired by the user while viewing a home shopping channel, i.e., when the user clicks on the user-desired goods, personal information required by a purchase may be unintentionally disclosed to the public.

As described above, a display control scheme of an external display device in a conventional mobile terminal has a problem in that some portion of the displayed TV screen will be obscured by an event message box 40 or personal information may be undesirably disclosed to the public. Thus, the conventional display control scheme is not suitable for processing the concurrent service in an external display device and in a mobile terminal. Such a conventional mobile terminal cannot offer a user who is watching broadcasts through the external display device other kinds of services because in a conventional mobile terminal, only one screen for the service currently being displayed can be provided to an external display device.

SUMMARY OF THE INVENTION

Accordingly, the present invention provides a display control apparatus and method in a mobile terminal having a function to output video data to an external display device that enables users to enjoy a variety of services in a mobile terminal separately from services offered by an external display device connected with the mobile terminal.

In addition, the present invention provides a display control apparatus and method in a mobile terminal having a function to output video data to an external display device that enables event processing in the mobile terminal, in addition to service currently being displayed on the external display device.

Further, the present invention provides a display control apparatus and method in a mobile terminal having a function to output video data to an external display device that prevents personal information from being publicly disclosed.

According to one aspect of the present invention, there is provided a display control method in a mobile terminal capable of outputting video data to an external display device. The method includes transmitting, by the mobile terminal, video data to be displayed on the external display device, determining whether an event occurs during displaying the video data on the external display device and upon occurrence of an event, displaying a screen for processing the event on the mobile terminal.

According to another aspect of the present invention, there is provided a display control apparatus in a mobile terminal capable of outputting video data to an external display device. The apparatus includes a radio unit for receiving an outside event, a controller for transmitting the video data through an interface to display the video data on the external display device and configuring a screen for processing an event when an event is notified from the radio unit; and a display for displaying the screen for processing the event under the control of the controller.

According to further aspect of the present invention, there is provided a display control apparatus in a mobile terminal capable of outputting video data to an external display device. The apparatus includes a Digital Multimedia Broadcasting (DMB) receiver for receiving broadcasting data received from digital broadcasting station in real time, a controller for transmitting the broadcasting data to the external display device through an interface to display the broadcasting data and upon occurrence of the event, configuring a screen for processing an event after determining whether an event occurs, and a display for displaying the screen for processing the event under the control of the controller.

BRIEF DESCRIPTION OF THE DRAWINGS

The above and other objects, features and advantages of certain exemplary embodiments of the present invention will become more apparent from the following detailed description when taken in conjunction with the accompanying drawings in which.

DETAILED DESCRIPTION OF THE PREFERRED EMBODIMENTS

Figure 1:
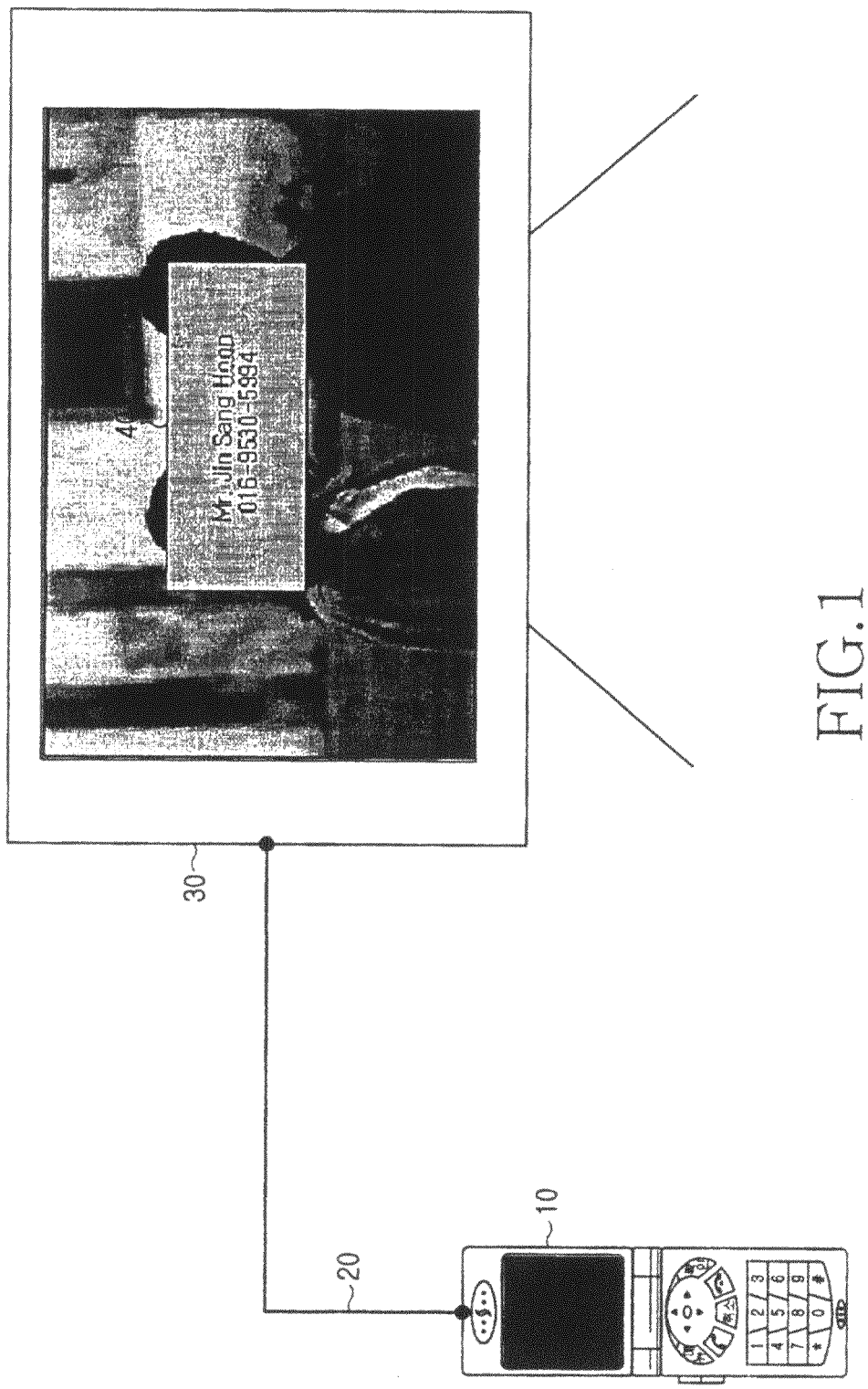
FIG. 1 illustrates a conventional mobile terminal having TV-out function, connected with a television.

Preferred embodiments of the present invention will now be described in detail with reference to the annexed drawings. For convenience, the same reference numerals are used to represent the same functional parts. In the following description, a detailed description of known functions and configurations incorporated herein will be omitted when it may make the subject matter of the present invention rather unclear.

The present invention implements a specific function that enables a user to enjoy other services in a mobile terminal while watching video data including broadcasts or using services displayed on an external display device connected with the mobile terminal. To accomplish the above function, the present invention performs the procedure of determining whether events occur while displaying video data sent by the mobile terminal on the external display device, and when it is determined that an event occurs, displaying a screen for processing the event on the mobile terminal. Thus, a user is able to use a concurrent service by using other kind of service in a mobile terminal while continuing to watch broadcasts or enjoy a service displayed on the external display device. In addition, when an event occurs, information relevant to the event is displayed only on the mobile terminal, irrespective of the displayed screen of the external display device. Therefore, a user's personal information can be protected from disclosure to the public.

The following description is for the operation of the mobile terminal having a TV-out function. The mobile terminal transmits video data to external display devices, such as a television and a computer monitor, through a cable and allows the video data to be displayed on the external display device. Herein, the video data transmitted to the external display device is compressed and converted to be suitable for the external display device, as well known to those skilled in the art.

The present invention includes a method of distinguishing the content of the external display device from the content of the mobile terminal and displaying each content individually on its associated screen. According to the present invention incoming call and message reception events may be processed through the screen of the mobile terminal, separately from the service provided to the external display device. Also, according to another embodiment of the present invention, while the external display device is displaying video data, the mobile terminal can display other screen for providing another services. Herein, the video data displayed on the external display device may be broadcast data provided in real time by a digital broadcasting station or moving pictures previously stored in the mobile terminal.

Figure 2:
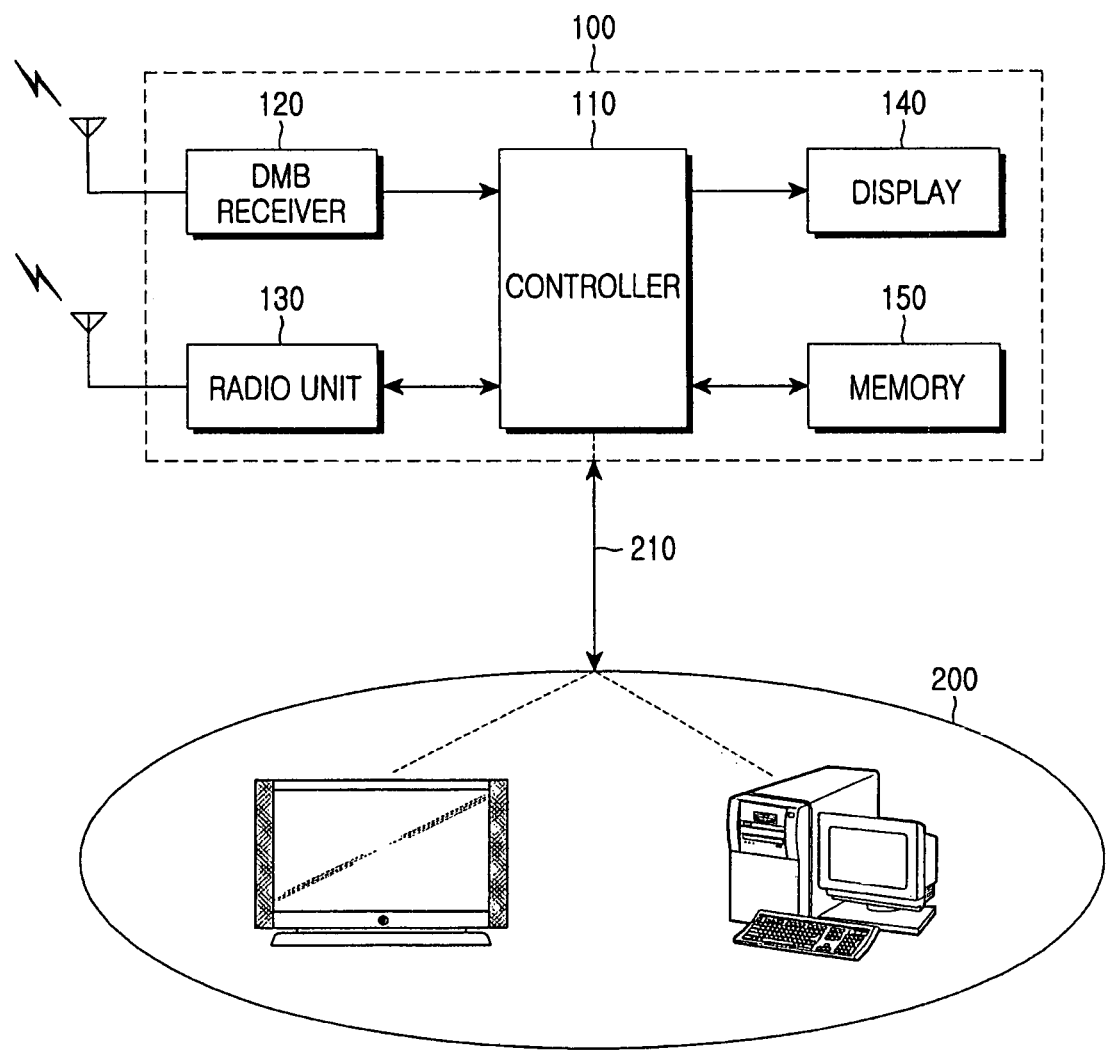
FIG. 2 is a block diagram illustrating a mobile terminal having TV-out function according to the present invention.

Elements and operation of a mobile terminal to which the present invention is applied will be described with reference to FIG. 2. FIG. 2 is a block diagram illustrating a mobile terminal having TV-out function according to the present invention. Referring to FIG. 2, a mobile terminal 100 is connected with any one of external display devices 200 through an interface 210. The mobile terminal 100 comprises a controller 110, a Digital Multimedia Broadcasting (DMB) receiver 120, a radio unit 130, a display unit 140 and a memory 150. Herein, techniques for the connectivity between the mobile terminal 100 and the external display devices 200 can be achieved using cable, infrared data communication, Bluetooth™ (herein "Bluetooth"), USB, IEEE 1394, Zigbee, W-LAN, etc. Thus, in the present invention, the mobile terminal 100 enables data transmission via interface 210 without physically being connected with the external display devices 200 through a cable.

The DMB receiver 120 receives broadcasting data through an antenna and then demultiplexes Transport Stream packets (hereinafter, referred to as TS packet) to thereby parse the broadcasting data into video and audio data through decoding. The video and audio data are then output to a screen and a speaker of the external display devices 200, respectively, through interface 210 under the control of the controller 110. Herein, a tuner and a decoder for performing demultiplexing and decoding can be incorporated into the DMB receiver 120, the operation of which are known to those skilled in the art and thus.

The radio unit 130 transmits/receives Radio Frequency (RF) signals to/from a base station through an antenna under the control of the controller 110. Especially, the radio unit 130 provides notification of event occurrence such as an incoming call, message reception, etc, to the controller 110. Thus, in the present invention, when the radio unit 130 provides notification of an event occurrence during display of video data sent by the controller 110 on the external display devices 200, the controller 110 configures a screen for processing the received event and displays the screen on the display unit 140. As such, the display unit 140 displays a variety of information including caller's information and the detailed contents of the received message in accordance with the notified event.

In addition, the display unit 140 receives and displays display data relative to key input data input by a key input unit (not shown) under the control of the controller 110, and allows a user to visually confirm its condition in setting or activating functions desired by the user. The display unit 140 can also display event contents received during broadcasting service being offered, other broadcasts provided by other channels in addition to the broadcasts currently displayed on the external display device 200 and broadcasting information including EPG information under the control of the controller 110.

The memory 150 stores a variety of information relevant to entire operation of the mobile terminal 100 and at the same time, information relevant to broadcasting service including Electronic Program Guide (EPG) information received under the control of the controller 110.

The controller 110 determines whether event occurrence is notified by the radio unit 130 while transmitting and displaying video data on the external display device 200. When the event occurrence notification is provided by the radio unit 130, the controller 110 outputs the contents of the notified event on the display unit 140 of the mobile terminal 100 while continuing to display video data on the external display device 200.

Figure 3:
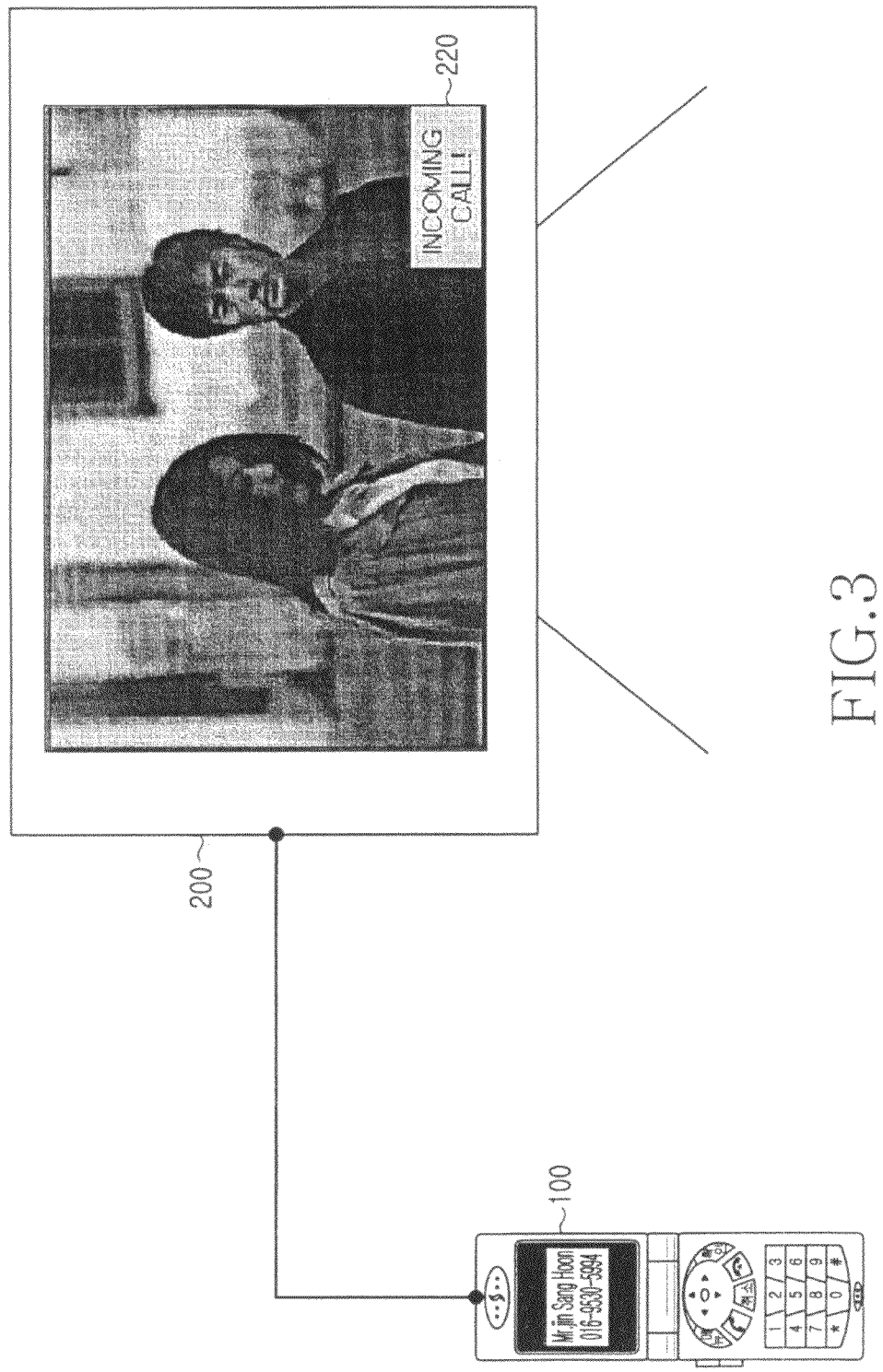
FIG. 3 illustrates screens in a mobile terminal and in an external display device, respectively, when an event occurs according to the present invention.

FIG. 3 shows screens displayed respectively in a mobile terminal and in an external display device when an event occurs according to the present invention. Referring to FIG. 3, it is illustrated, by way of example, that upon receipt of an incoming call, a message notifying of the occurrence of an event, which is indicated by reference numeral 220, is presented at the bottom of the screen of the external display device 200 on which video data is being currently displayed and caller's information relevant to the event is displayed on the screen of the mobile terminal 100. That is to say, FIG. 3 shows that upon receipt of an incoming call during displaying video data including broadcasting data, the controller 110 distinguishes the contents of an event from video data and then displays the event data on the mobile terminal 100 and the video data on the external display device 200.

Herein, it is preferred that a message indicated by reference numeral 220 is placed on the bottom of the screen of the external display device 200 so that a screen on which video data is currently displayed may overlap only a slight portion of the lower end of the screen, allowing a user to continue to watch the video data currently being displayed without any inconvenience. The reason why the message is located at the bottom of the screen is to prevent user's inconvenience while watching TV programs, but of course the message can be placed at other positions. Also, to achieve the object of the present invention for protecting user's privacy, it may be possible that the external display device 200 presents only the event-notifying message, while the specific contents of the event including caller's information and details of the message are displayed only on the mobile terminal 100. Herein, the event-notifying message can be placed at any location on the screen. However, it is preferable that the event-notifying message has to be placed at the edge of the screen to avoid user inconvenience while watching TV programs. The message may function simply as an event-notifying message but may further include brief information including a telephone number and an emergency message relative to the event. Herein, it is preferable that the limited information that is included in the event-notifying message displayed on external display device 200 does not infringe on the user's privacy.

As described above, it is advantageous in that upon receipt of the event including incoming call and message reception, the details of the received events such as caller information and the contents of the message are displayed on the mobile terminal, separately from the operation of displaying video data on the external display device 200, thus avoiding public display of user's personal information and protection of user's privacy.

The TV program displayed in FIG. 3 is provided as an example, and the present invention is not limited to this. In other words, a variety of video data including moving pictures stored in the mobile terminal 100 and broadcasting data received through the DMB receiver 120 can be displayed on the screen of the external display device 200. In addition, all kinds of mobile terminals including TV-out function but not having a feature of receiving broadcasting data can also be applied to the mobile terminal 100 of the present invention besides mobile terminals capable of receiving broadcasting data.

Figure 4:
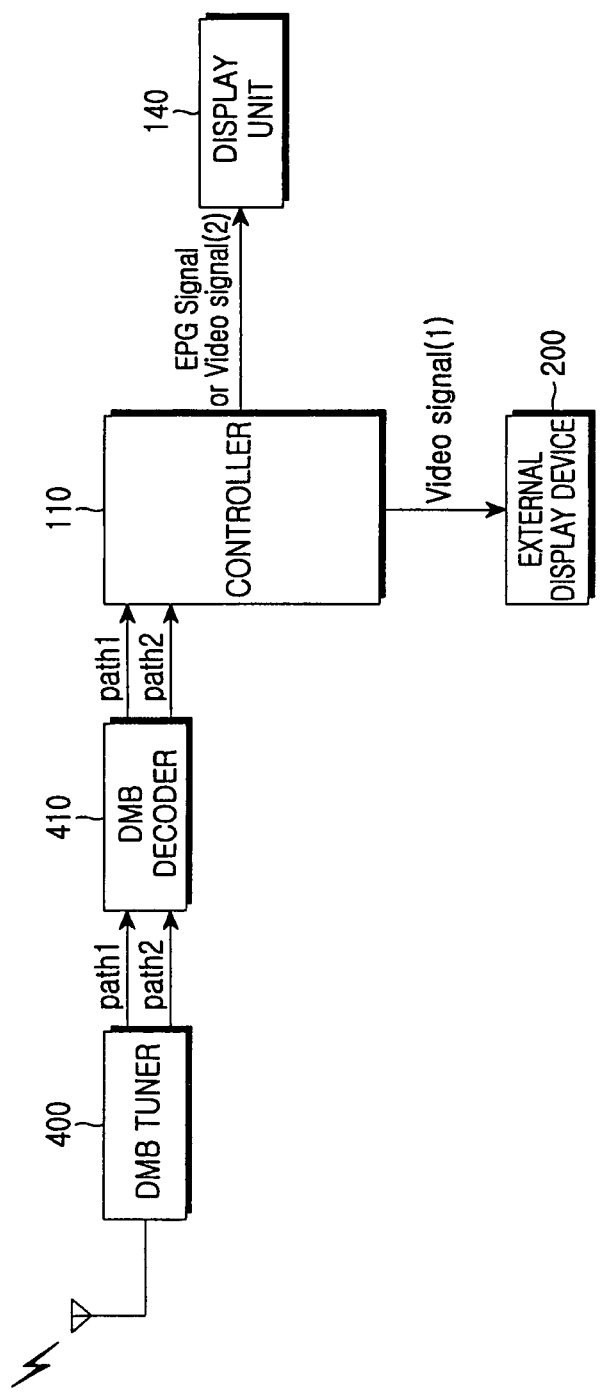
FIG. 4 is a block diagram illustrating a mobile terminal having TV-out function according to another embodiment of the present invention.

A description will be now made of constituent elements of the mobile terminal and their operation with reference to FIG. 4. FIG. 4 is a block diagram illustrating a mobile terminal having TV-out function according to the present invention and, more specifically, in FIG. 4, the DMB receiver 120 shown in FIG. 2 is replaced with a Digital Multimedia Broadcasting (DMB) tuner 400 and a Digital Multimedia Broadcasting (DMB) decoder 410. The DMB tuner 400 that is connected in parallel to the DMB decoder 410 through two RF paths processes two kinds of terrestrial ensembles or simultaneously receives both terrestrial DMB broadcasting and satellite DMB broadcasting. If a DMB tuner that enables reception of two terrestrial DMBs or two satellite DMBs may be implemented, then the controller can process terrestrial DMB and satellite DMB in combination and provide concurrent service.

The DMB decoder 410 receives at least one broadcasting data that is input by DMB tuner 400 in parallel and transmits the data to the controller 110 through two paths. Herein, one path is connected to the display unit 140 and the other path is connected to the external display device 200 under the control of the controller 110. As shown in FIG. 2, the mobile terminal 100 is connected with the external display device 200 through the interface 210. Accordingly, each broadcasting data having been displayed on the external display device 200 by separating a main screen and a sub screen will be displayed, respectively, on either the screen of the mobile terminal 100 or the external display device 200 after being separated. For instance, it may be possible that through one path, broadcasting data on the currently selected channel is output to the external display device 200 and through an other path different broadcasting data on the other channel excepting the currently selected channel is output to the display unit 140. That is, while continuing to display TV programs on the currently selected channel on the main screen of the external display device, other TV programs that have been displayed on the sub screen are displayed on the screen of the mobile terminal 100.

As described above, two RF paths connecting from the DMB tuner 400 to the controller 110 are provided and thus it is possible to display different broadcasting data respectively on the external display device 200 and the mobile terminal 100 after being separated. In addition, it is possible to display EPG service on the mobile terminal 100 while displaying a broadcast on the external display device 200. Generally, during displaying broadcasts on the external display device 200, the screen of the mobile terminal is blocked. However, according to a preferred embodiment of the present invention, EPG service can be enjoyed through the mobile terminal 100 regardless of displaying broadcasts on the external display device. Herein, the EPG service informs a user of what is playing on what channel and provides rich program descriptors, which will describe the program/movie plot, start time, duration, actors, directors and genre.

Accordingly, using the present invention, a user can conveniently enjoy the EPG service, without discontinuing broadcasts currently being displayed on the external display device 200. That is, without having to close the current broadcasting display scheme, a user may access EPG service through the mobile terminal 100 while continuing to watch broadcasts being displayed on the external display device 200, thereby allowing enjoyment of concurrent service without limitation.

Figure 5:
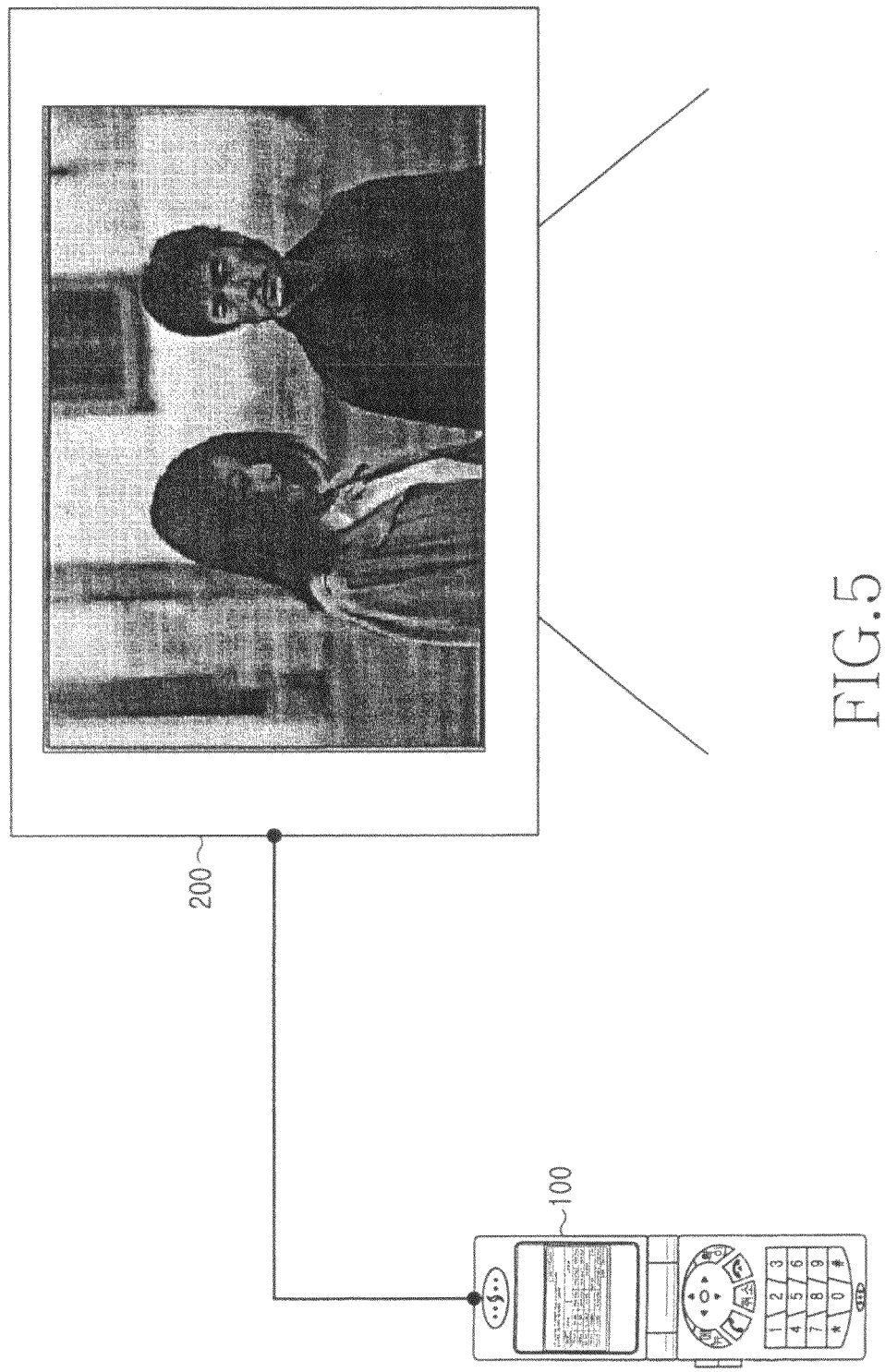
FIG. 5 illustrates display of a broadcasting service and an Electronic Program Guide (EPG) service according to another embodiment of the present invention.
Figure 6:
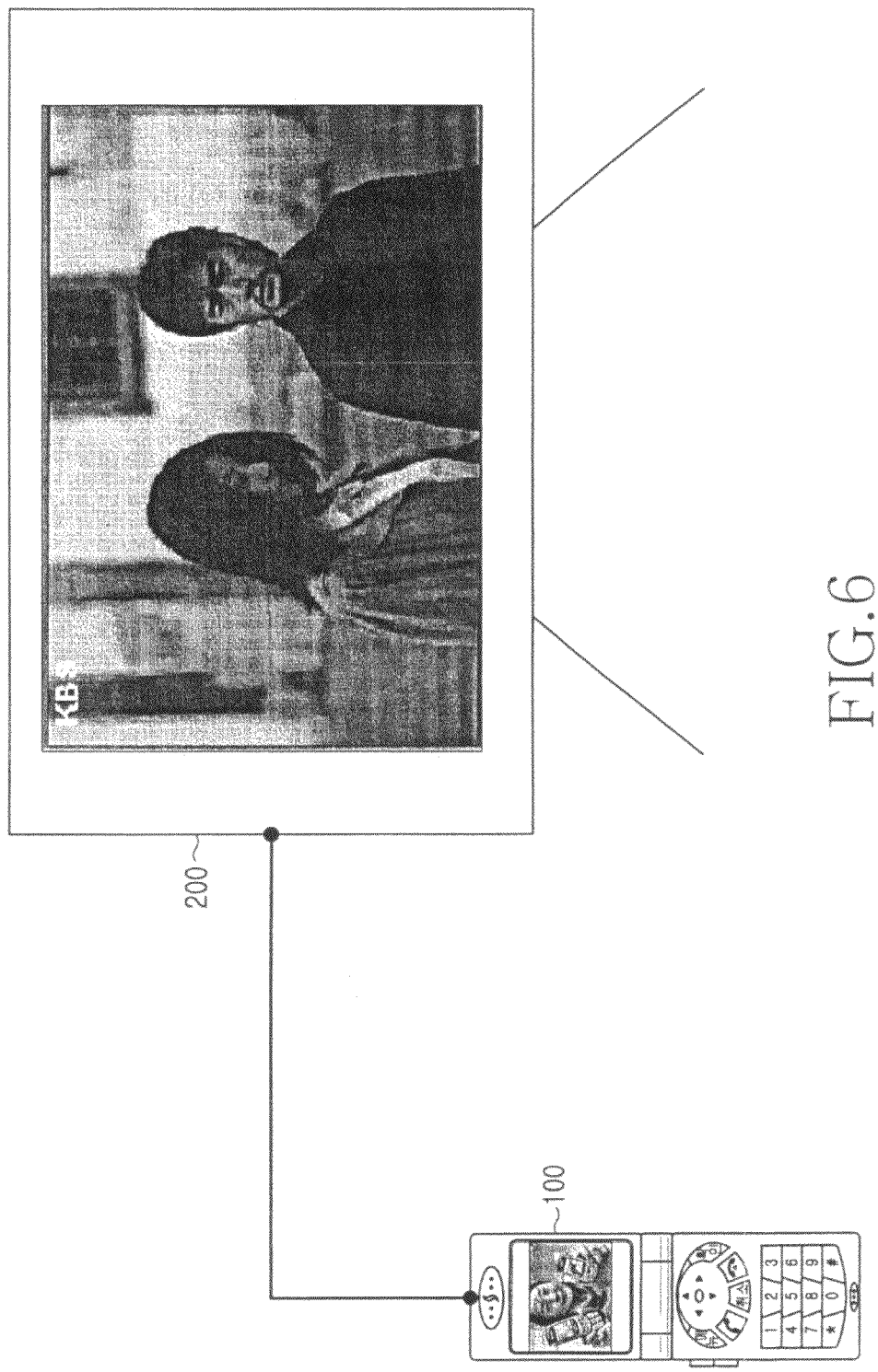
FIG. 6 illustrates display of different broadcasting services according to another embodiment of the present invention.

FIG. 5 illustrates display of a broadcasting service and the Electronic Program Guide (EPG) service according to the present invention. More specifically, in FIG. 5, it is illustrated that pursuant to a user's request for the EPG service, while continuing to display broadcasts on the external display device 200, information about the EPG service is displayed on the screen of the mobile terminal 100. FIG. 6 illustrates display of different broadcasting services according to the present invention. In FIG. 6, the currently selected TV program is being displayed on the external display device 200 whereas information regarding different TV programs provided on other channels are being displayed on the screen of the mobile terminal 100.

Although the above description focuses on display of received broadcasting service, it is understood that the present invention can also be applied to display of video data stored in the mobile terminal 100 on the external displaying device 200. Alternatively, in a mobile terminal having projection function, it is possible to divide the projected screen and the screen of the mobile terminal and then displaying them separately.

As can be understood from the foregoing description, according to the present invention, when an event occurs during displaying video data of the mobile terminal on the external display device, the mobile terminal processes the event and allows a user to continue to watch the video data currently being displayed on the external display device without limitation.

In addition, the present invention is advantageous in that since detailed information about events including call incoming and message reception is only displayed on the screen of the mobile terminal, and not displayed on the screen of the external display device, a user's privacy can be fully protected.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A display control method in a mobile terminal capable of outputting video data to an external display device, the method comprising the steps of: wirelessly transmitting, by the mobile terminal, video data to be displayed on the external display device; determining whether an event occurs while displaying the video data on the external display device; upon occurrence of the event, displaying a sender/caller identifying event indicator at a screen of the mobile terminal device; and displaying a sender/caller non-identifying event indicator at an edge of a screen of the external display device while the video data is being displayed on the external display device, wherein the event comprises one of a receipt of a text message and a receipt of a phone call, and wherein, the sender/caller identifying event indicator comprises a sender identification and contents of the text message if the event is the receipt of the text message, and the sender/caller identifying event indicator comprises a caller identification or a caller number if the event is the receipt of the phone call.

2. The method as set forth in claim 1, wherein the event indicator is displayed at the bottom of the screen of the external display device.

3. The method as set forth in claim 1, wherein the video data includes at least one of broadcasting data received in real time and moving pictures stored in advance.

4. The method as set forth in claim 1, wherein the video data is transmitted to the external display device through an interface.

5. The method as set forth in claim 4, wherein the interface uses at least one of cable, infrared data communication, Bluetooth, USB, IEEE 1394, Zigbee, and wireless Local Area Network (LAN).

6. The method as set forth in claim 2, wherein the event indicator is displayed to overlap only a slight portion of the screen.

7. A display control apparatus in a mobile terminal capable of outputting video data to an external display device, the apparatus comprising: a controller for wirelessly transmitting the video data through an interface to display the video data on the external display device, for determining whether an event occurs while displaying the video data on the external display device, for determining whether an event occurs while displaying the video data on the external display device, for, upon determination of occurrence of the event, controlling display of a sender/caller identifying event indicator at a screen of the mobile terminal device, and for controlling display of sender/caller non-identifying event indicator at an edge of a screen of the external display device while the video data is being displayed on the external display device; and a display units for displaying the sender/caller identifying and sender/caller non-identifying event indicators, wherein the event comprises one of a receipt of a text message and a receipt of a phone call, and wherein, the sender/caller identifying event indicator comprises a sender identification and contents of the text message if the event is the receipt of the text message, and the sender/caller identifying event indicator comprises a caller identification or a caller number if the event is the receipt of the phone call.

8. The apparatus as set forth in claim 7, wherein the controller controls to display the event indicator at the bottom of the screen of the external display device.

9. The apparatus as set forth in claim 7, wherein the video data includes at least one of broadcasting data received in real time and moving pictures stored in advance.

10. The apparatus as set forth in claim 9, further comprising a Digital Multimedia Broadcasting (DMB) receiver for receiving broadcasting data received from a digital broadcasting station in real time.

11. A display control apparatus in a mobile terminal capable of outputting video data to an external display device, the apparatus comprising: a Digital Multimedia Broadcasting (DMB) receiver for receiving broadcasting data from a digital broadcasting station in real time; a controller for wirelessly transmitting the broadcasting data to be displayed on the external display device through an interface, for determining whether an event occurs while displaying the video data on the external display device, for, upon determination of occurrence of the event, controlling display of a sender/caller identifying event indicator at a screen of the mobile terminal device, and for controlling display of sender/caller non-identifying event indicator at an edge of a screen of the external display device while the video data is being displayed on the external display device; and a display units for displaying the sender/caller identifying and sender/caller non-identifying event indicators, wherein the event comprises one of a receipt of a text message and a receipt of a phone call, and wherein, the sender/caller identifying event indicator comprises a sender identification and contents of the text message if the event is the receipt of the text message, and the sender/caller identifying event indicator comprises a caller identification or a caller number if the event is the receipt of the phone call.

12. The method as set forth in claim 1, wherein the external display device is not a mobile terminal

* * * * *